United States Patent
Stahl et al.

(10) Patent No.: US 8,608,534 B1
(45) Date of Patent: Dec. 17, 2013

(54) ROLLED SECONDARY CUT OFF IN AIR DISTRIBUTION SYSTEM OF A COMBINE HARVESTER

(71) Applicant: AGCO Corporation, Duluth, GA (US)

(72) Inventors: Michael S. Stahl, Moundridge, KS (US); Joseph M. Biggerstaff, Wichita, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 13/625,920

(22) Filed: Sep. 25, 2012

(51) Int. Cl.
*A01F 12/48* (2006.01)
*B07B 1/55* (2006.01)
*B08B 5/00* (2006.01)

(52) U.S. Cl.
USPC .................................................. 460/99

(58) Field of Classification Search
USPC ............. 460/99, 100, 101; 209/395, 639, 923
See application file for complete search history.

(56) References Cited

U.S. PATENT DOCUMENTS

| | | | | |
|---|---|---|---|---|
| 3,800,804 A | * | 4/1974 | Boone | 460/99 |
| 3,833,006 A | * | 9/1974 | Temple | 460/99 |
| 4,007,744 A | * | 2/1977 | Shaver | 460/74 |
| 4,307,732 A | * | 12/1981 | De Busscher et al. | 460/99 |
| 4,353,376 A | * | 10/1982 | Schuler | 460/67 |
| 4,401,128 A | * | 8/1983 | Fisher | 460/99 |
| 4,465,082 A | * | 8/1984 | Strubbe | 460/98 |
| 4,589,425 A | * | 5/1986 | Mitchell, Jr. | 460/99 |
| 4,627,446 A | * | 12/1986 | Huhman | 460/74 |
| 5,387,154 A | * | 2/1995 | Peters | 460/99 |
| 5,558,576 A | * | 9/1996 | Meyers | 460/99 |
| 5,624,315 A | * | 4/1997 | Jonckheere | 460/99 |
| 5,795,223 A | * | 8/1998 | Spiesberger et al. | 460/102 |
| 6,261,051 B1 | * | 7/2001 | Kolacny | 415/53.3 |
| 6,773,343 B2 | * | 8/2004 | Schlautman et al. | 460/99 |
| 6,921,330 B2 | * | 7/2005 | Grywacheski et al. | 460/100 |
| 7,399,223 B2 | * | 7/2008 | Weichholdt et al. | 460/101 |
| 7,413,507 B2 | * | 8/2008 | Weichholdt | 460/100 |
| 8,052,374 B2 | * | 11/2011 | Ricketts | 415/53.1 |
| 8,221,064 B2 | * | 7/2012 | Ricketts et al. | 415/184 |
| 8,286,798 B2 | * | 10/2012 | Ricketts et al. | 209/138 |
| 2002/0037758 A1 | * | 3/2002 | Visagie et al. | 460/99 |
| 2002/0086722 A1 | * | 7/2002 | Kuhn et al. | 460/100 |
| 2004/0226275 A1 | * | 11/2004 | Baumgarten et al. | 56/153 |

FOREIGN PATENT DOCUMENTS

WO    WO 2008149233 A2 * 12/2008

* cited by examiner

*Primary Examiner* — Árpád Fábián-Kovács

(57) ABSTRACT

A combine harvester has a threshing mechanism for threshing grain and cleaning apparatus for removing chaff from the threshed grain. The threshing mechanism includes a rotor and a plurality of concaves and the cleaning apparatus includes and upper chaffer and a lower sieve. A blower provides cleaning air to the combine harvester. The blower is situated in a blower housing having a first cut off plate separating high-velocity air coming from the blower and directing a first portion of the high-velocity air to a lower duct that provides an airstream to the upper chaffer and lower sieve. The blower housing also has a second cut off plate directing a second portion of the high-velocity air to an upper duct that provides an airstream under the concaves. A leading portion of the second cut off plate contains a rolled edge along the width of the upper duct.

6 Claims, 4 Drawing Sheets

US 8,608,534 B1

ROLLED SECONDARY CUT OFF IN AIR DISTRIBUTION SYSTEM OF A COMBINE HARVESTER

BACKGROUND OF THE INVENTION

1. Field of Invention

This invention relates to threshing and cleaning systems for combine harvesters, and more particularly, to a blower mechanism for managing the airflow through the threshing and cleaning systems of the combine harvester.

2. Description of Related Art

Combine harvesters have a threshing mechanism for threshing the harvested crop and a cleaning system used to remove chaff and other residue from the threshed crop. In one example, a rotor cooperates with concaves to thresh the harvested material, and initial separation occurs as grain and smaller residue are pushed through the grated concaves by centrifugal force to the cleaning system. Large residue pieces such as stalks and stems continue to move rearwardly and are eventually discharged out the rear end of the rotor assembly where it is acted upon by a chopper or spreader and deposited on the ground.

Within the cleaning system, oscillating sieve assemblies in conjunction with air flow remove the chaff from the threshed grain, which gravitates through the chaffer and sieve assembly to an oscillating clean grain pan. The clean grain pan, in turn, directs the clean grain to a discharge auger that elevates the grain to an onboard storage bin. A second oscillating pan directs materials other than grain over the edge of the bottom sieve assembly to a different discharge outlet for recirculation back through the threshing, separating and cleaning apparatus to extract the previously unthreshed grain.

A blower may be used to produce an airstream that entrains the lighter non-grain particles and carries them out the rear of the harvester. However, it can be challenging to control the airflow from the blower to get an even distribution of air across both the threshing mechanism and the cleaning system.

OVERVIEW OF THE INVENTION

In one embodiment, the invention is directed a combine harvester having a threshing mechanism for threshing grain and cleaning apparatus for removing chaff from the threshed grain. The threshing mechanism includes a rotor and a plurality of concaves and the cleaning apparatus includes and upper chaffer and a lower sieve. The combine harvester also has a blower having a rotating impeller providing cleaning air to the threshing mechanism and cleaning apparatus. The blower is situated in a blower housing having a first cut off plate separating high-velocity air coming from the blower and directing a first portion of the high-velocity air to a lower duct that provides an airstream to the upper chaffer and lower sieve. The blower housing also has a second cut off plate directing a second portion of the high-velocity air coming from the blower to an upper duct that provides an airstream under the rotor and concaves with high-velocity air not entering the lower and upper ducts being exhausted from the blower housing. A leading portion of the second cut off plate contains a rolled edge along the width of the upper duct.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF EXAMPLE EMBODIMENTS

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References hereinafter made to certain directions, such as, for example, "front", "rear", "left" and "right", are made as viewed from the side of the combine.

Figure 1:
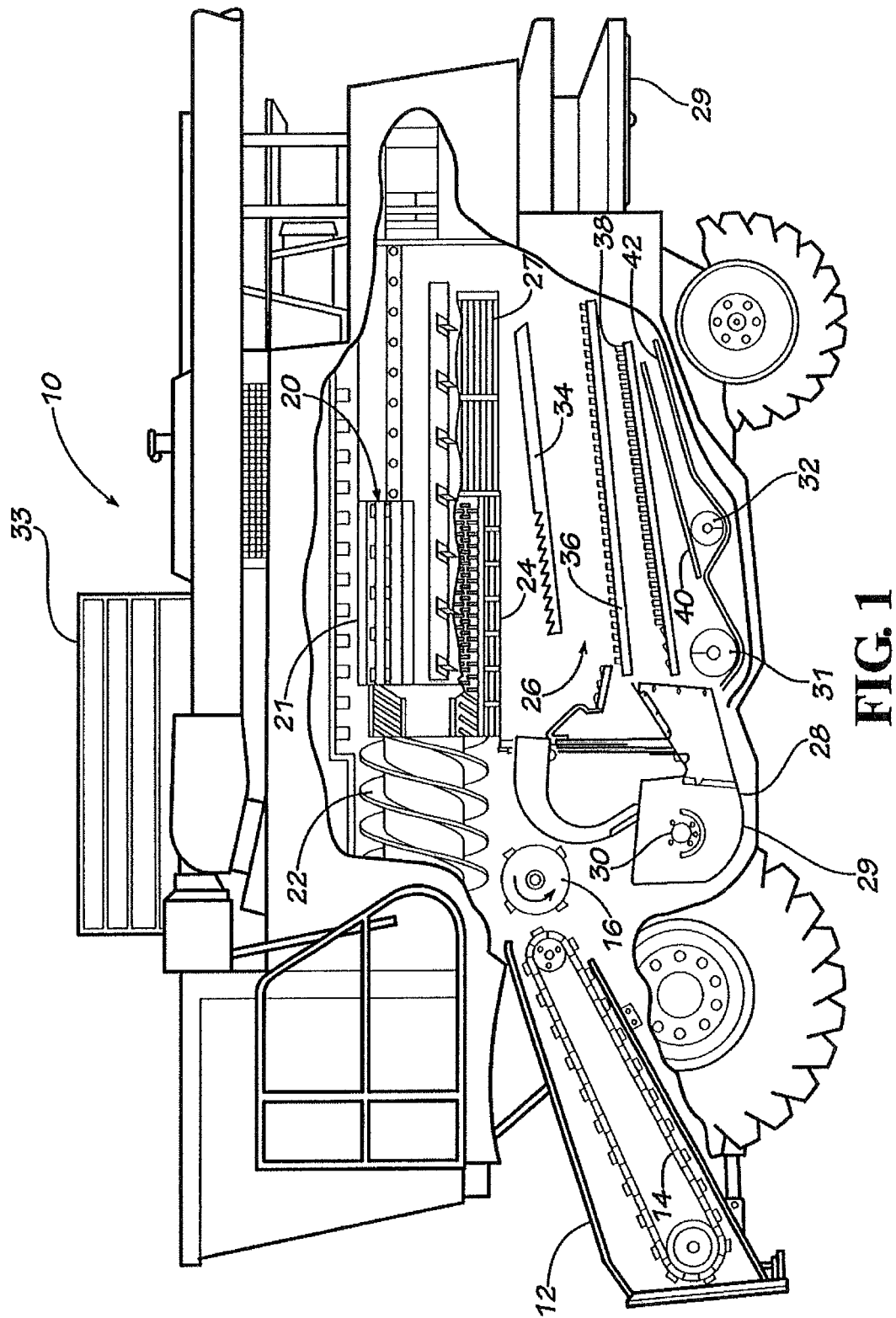
FIG. 1 is a schematic side elevational view of a combine harvester with parts broken away to reveal internal details of the feeding, threshing, separating and cleaning portions of the machine.

FIG. 1 schematically illustrates one type of combine harvester 10 to which the present invention relates. Although the harvester 10 chosen for purposes of illustration is a so-called axial rotary combine in which the threshing mechanism comprises a rotor disposed axially of the machine with respect to its fore-and-aft axis, many other types of threshing and separating mechanisms are currently in commercial use and it is not intended that the principles of the present invention be limited to any one particular type of threshing and separating mechanism.

In relevant part, harvester 10 has a feed housing 12 that receives harvested materials from a suitable header (not shown) and advances such materials upwardly and rearwardly via a conveyor 14 toward a beater 16 rotating in a counterclockwise direction viewing FIG. 1. Beater 16 impels the harvested materials upwardly and rearwardly into a receiving housing 18. Housing 18 contains the front end of a threshing mechanism, broadly denoted by the numeral 20. In the illustrated embodiment, the threshing mechanism 20 comprises a rotor 21 with a front end having a series of helical vanes 22 that start the materials moving rearwardly in a spiral path of travel along the outside of the rotor 21. As the materials move rearwardly, concaves 24 cooperate with rotor 21 to thresh the materials, and initial separation occurs as grain and smaller residue are pushed through the grated concaves region by centrifugal force to the cleaning apparatus 26. Large residue pieces such as stalks and stems continue to move rearwardly past a separating grate 27 which allows grain to pass radially out of the rotor area to cleaning apparatus 26, but not the larger residue. Such residue eventually discharges out the rear end of the rotor assembly where it is acted upon by a chopper or spreader (now shown) and deposited on the ground. One skilled in the art will understand that other threshing and separating mechanisms 20, such as a cylinder and concaves, may be used without departing from the scope of the invention.

Generally speaking, the threshed grain works its way downwardly through the machine as it is acted upon by the cleaning apparatus 26 and a blower 28. The blower 28 has a blower housing 29 which contains a rotatable impeller 30 configured to generate a high-velocity stream of air. The light chaff particles become airborne by the rearwardly directed airstream generated by the blower 28 and are discharged out the rear of the machine. Clean grain ultimately finds its way to a discharge auger 31 leading to an elevator that conveys the clean grain up to a storage tank 33 at the top of the machine. Tailings, consisting of some grain along with other particles of residue, find their way to a tailings return auger 32 which then elevates the tailings via means not illustrated for recirculation back through the threshing, separating and cleaning areas to further separate grain from such residue.

The combine harvester 10 includes as part of its cleaning apparatus 26 an upper oscillating pan 34 that delivers materials received from concaves 24 and grate 27 generally downwardly and forwardly. Those materials from pan 34 land on an upper oscillating upper chaffer 36. The upper chaffer 36 allows grain to pass downwardly through openings in the upper chaffer 36 while larger particles are impelled generally upwardly and rearwardly until being discharged off the rear end of the upper chaffer 36 and out the back of the combine harvester 10 to the ground. A finer oscillating lower sieve 38 receives the grain and residue that has passed through the upper chaffer 36 and performs essentially the same type of classifying function as upper chaffer 36. The smaller kernels of grain fall through the lower sieve 38 and onto an oscillating grain pan 40, which delivers the grain into the clean grain auger 30. The larger tailings particles unable to penetrate lower sieve 38 travel off the rear discharge end of lower sieve 38 and drop to a tailings return pan 42 that feeds such materials to the tailings return auger 32. As the kernels of grain gravitate through upper and lower sieves 36 and 38, the airstream from blower 28 entrains the light non-grain particles and carries them out the rear of the machine.

Figure 2:
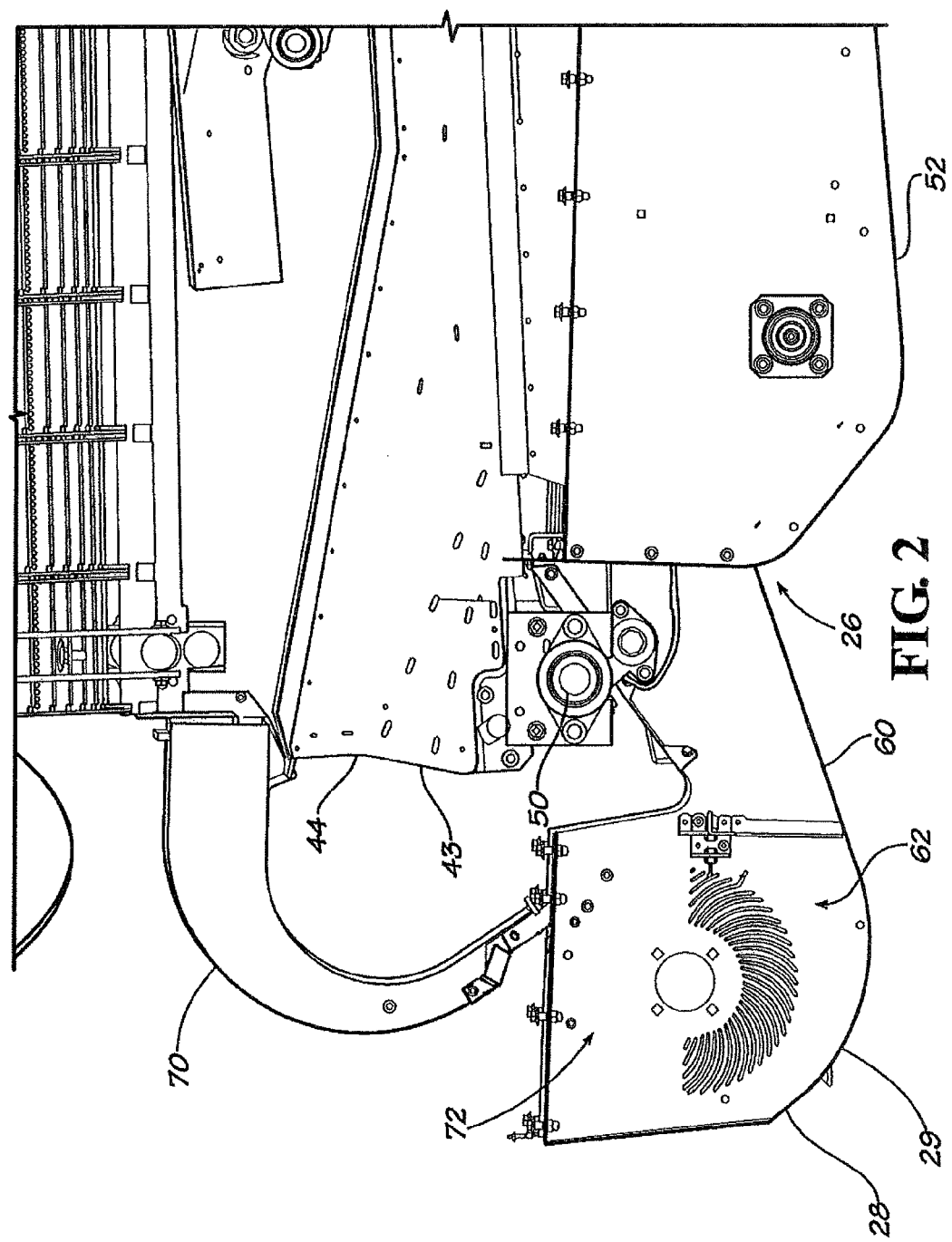
FIG. 2 is a side view showing a blower housing and ducting the cleaning system of the combine harvester off FIG. 1.

Turning now to FIG. 2, a somewhat enlarged view of one embodiment of the cleaning apparatus 26 and blower 28 is illustrated. The upper chaffer 36 and lower sieve 38 (FIG. 1) of the cleaning apparatus 26 are supported by a frame 43. In the illustrated embodiment, upper chaffer 36 is supported on an upper portion 44 of frame 43. The upper portion 44 is connected to a transverse, oscillating jackshaft 50 using any suitable means as is known in the art. In one embodiment, the lower sieve 38 is desirably mounted on a common lower portion 52 of frame 43 it shares with the clean grain pan 40 and tailings return pan 42 (FIG. 1). At its front end, the lower portion 52 is suspended from the oscillating shaft 50 via a suitable pivot connection as is known in the art. Driving power for oscillating the upper and lower portions 44, 52 of the frame 43 is provided by a suitable eccentric input drive unit connected to the jackshaft 50 so as to cause oscillating rotation of the shaft 50.

Figure 3:
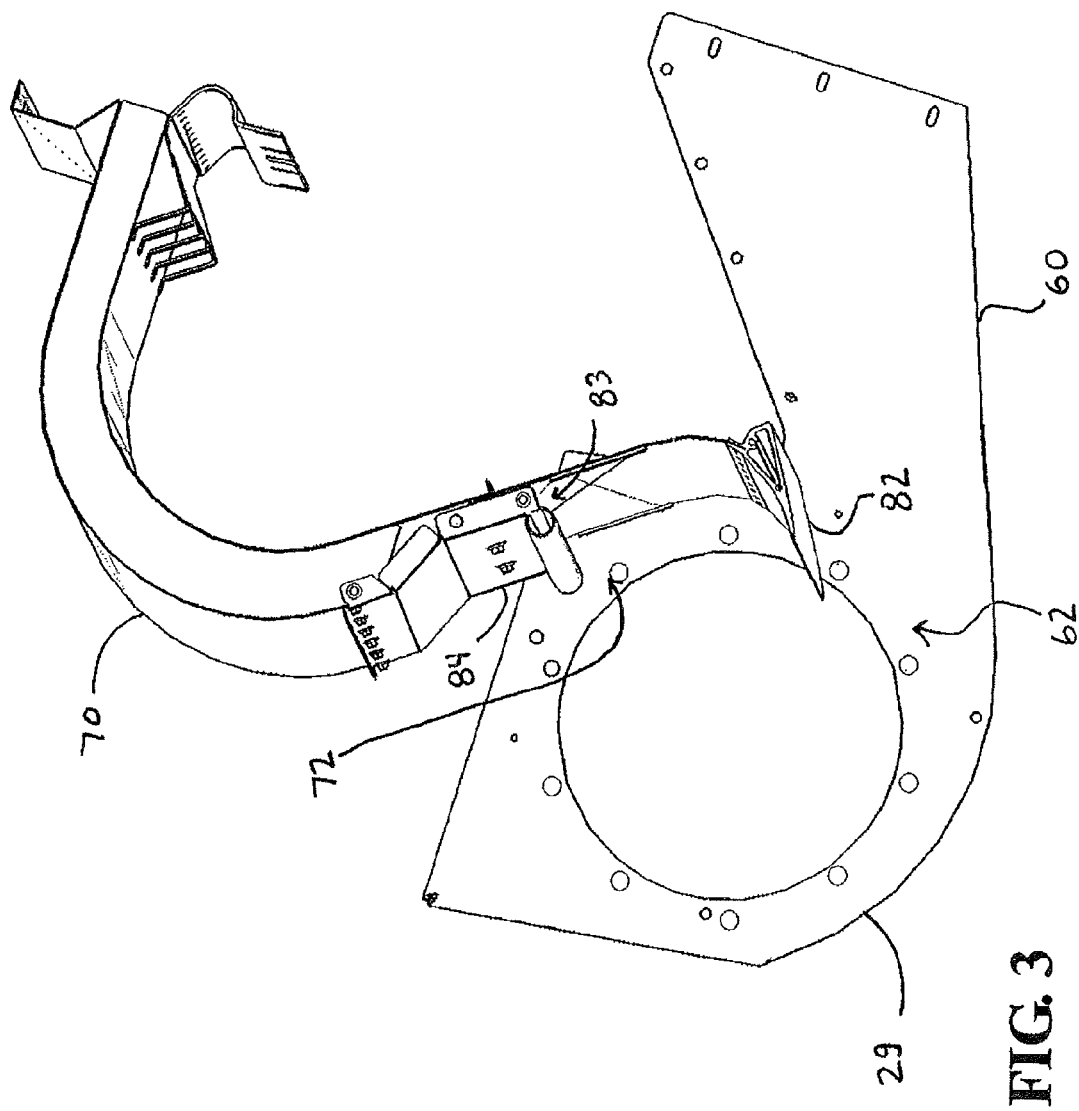
FIG. 3 is a partial cut-away perspective view of the blower housing and upper duct of the cleaning system of FIG. 2 according to an embodiment of the invention.

The blower housing 29 has a dual outlet configuration with a lower duct 60 that directs a first high-velocity airstream from the blower 28 out of a lower portion 62 of the blower housing 29 and an upper duct 70 that directs a second high-velocity airstream out of an upper portion 72 of the blower housing 29. The lower duct 60 connects with the frame 43 and directs its airstream toward the upper chaffer 36 and lower sieve 38. The upper duct 70 directs an airstream immediately under the rotor 20 and concaves 24. In the illustrated embodiment, the blower housing 29 and first and upper ducts 60, 70 are configured with an elongated width such that the ducts 60, 70 direct the airstreams along substantially the entire width of the concaves 24 and upper chaffer 36 and lower sieve 38. As best seen in the view of FIG. 3 with portions of the blower housing 29 cut away for clarity, a first cut off plate 82 separates the high-velocity air coming from the blower 28 and directs a portion of the high-velocity air to the lower duct 60. High-velocity air not entering the lower duct 60 continues around the blower housing 29 toward an inlet 83 of the upper duct 70.

Figure 4:
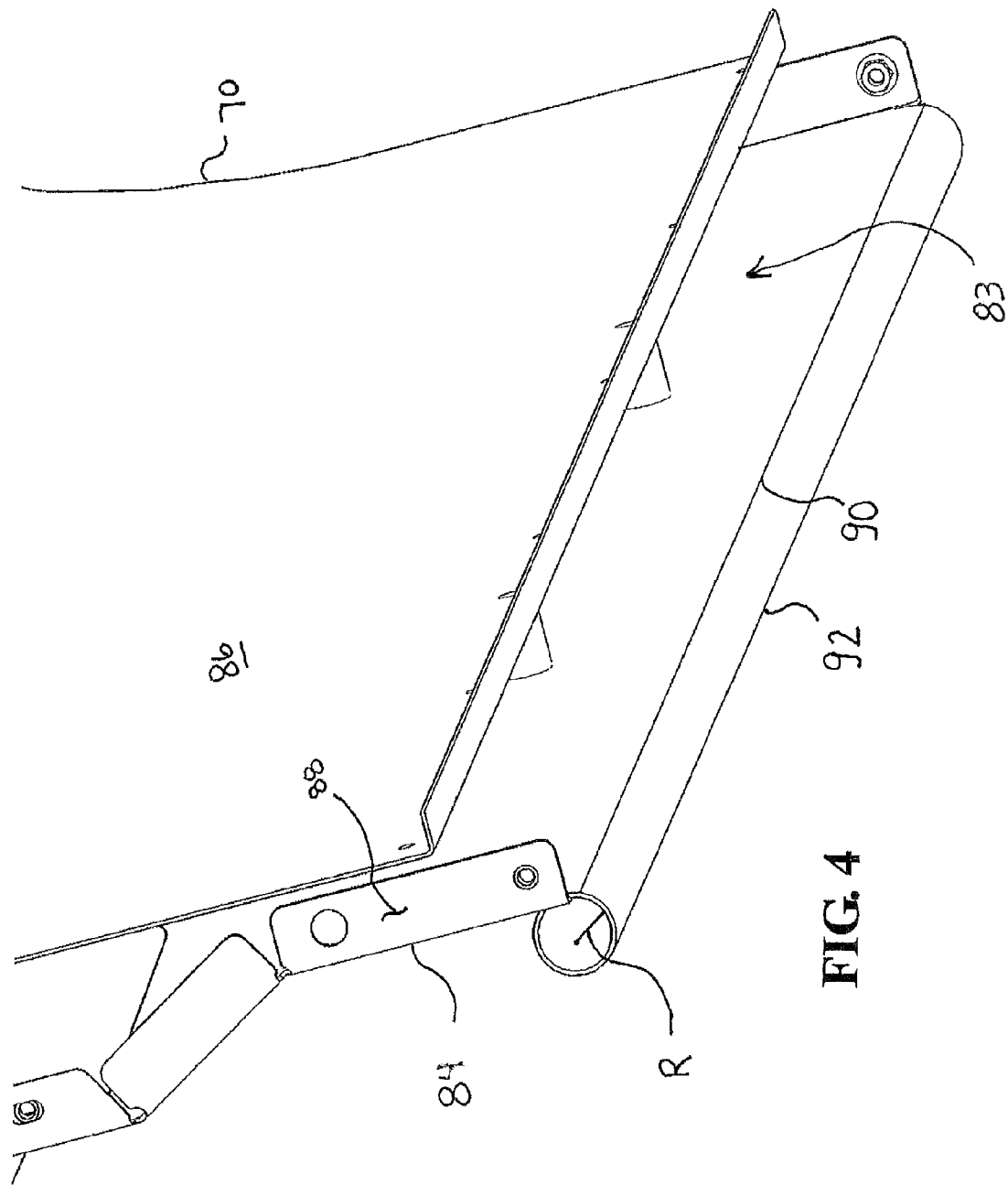
FIG. 4 is an enlarged perspective view of a portion of the upper duct.

Turning also now to FIG. 4, a second cut off plate 84 directs a portion of the high-velocity air to the upper duct 70 while the remaining portion of high-velocity air not entering the upper duct 70 is exhausted from the blower housing 29. The second cut off plate 84, along will rear wall 86 and side walls 88 form the inlet 83 to the second duct 70. The second cut off plate 84 may be configured to narrow the throat of the inlet 83 to aid in directing the desired airflow through the upper duct 70. According to the invention, a leading portion 90 of the second cut off plate 84 contains a rolled edge 92 along the width of the upper duct 70. In the illustrated embodiment, the rolled edge 92 curves outwardly away from the inlet 83 of the upper duct 70 and has a radius R of between about 10 mm and 50 mm, and more desirably about 25 mm. Desirably, the rolled edge 92 curves back to the outer face of the second cut off plate 84 to form a substantially closed circular shape. However, one skilled in the art will understand that the rolled edge 92 may curve inwardly toward the inlet 83 and need not form a closed circle. Varying the radius of the rolled edge 92 allows for variable velocity in the upper duct 70. It is believed that the geometry of the rolled edge 92 of the second cut off plate 84 at the inlet 83 of the upper duct 70 creates an aerodynamic surface enabling a more airflow uniform pattern while not causing substantial negative effect on the airflow through the lower duct 60.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A combine harvester having a threshing mechanism for threshing grain and cleaning apparatus for removing chaff from the threshed grain, wherein the threshing mechanism comprises a rotor and a plurality of concaves and the cleaning apparatus comprises and upper chaffer and a lower sieve and a blower situated in a blower housing providing cleaning air to the threshing mechanism and cleaning apparatus, wherein the improvement comprises:

the blower housing having a first cut off plate separating high-velocity air coming from the blower and directing a first portion of said high-velocity air to a lower duct that provides lower airstream to the upper chaffer and lower sieve, and said blower housing having a second cut off plate directing a second portion of said high-velocity air to an inlet of an upper duct that provides an upper airstream directed under the concaves, the second cut off plate extending downward between opposing side walls of the blower housing such that the inlet of the upper duct is formed by a rear wall of the blower housing, the opposing side walls of the blower housing and the second cut off plate, wherein a leading portion of said second cut off plate curves back toward a face of the second cut off plate to form a rolled edge along the width of said upper duct between the opposing side walls of the blower housing.

2. The combine harvester of claim 1 wherein the rolled edge curves outwardly away from the inlet of the upper duct.

3. The combine harvester of claim 1 wherein the rolled edge has a radius of between 10 mm and 50 mm.

4. The combine harvester of claim 1 wherein the rolled edge has a radius of about 25 mm.

5. The combine harvester of claim 1 wherein the rolled edge curves back to the face of the second cut off plate to form a substantially closed circular shape.

6. The combine harvester of claim 1 wherein the rolled edge curves back toward the face of the second cut off plate but does not touch the face.

\* \* \* \* \*